US012615455B2

(12) United States Patent
Omodani

(10) Patent No.: US 12,615,455 B2
(45) Date of Patent: Apr. 28, 2026

(54) PHOTOELECTRIC CONVERSION DEVICE

(71) Applicant: CANON KABUSHIKI KAISHA, Tokyo (JP)

(72) Inventor: Satoshi Omodani, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 83 days.

(21) Appl. No.: 18/825,288

(22) Filed: Sep. 5, 2024

(65) Prior Publication Data

US 2025/0097603 A1 Mar. 20, 2025

(30) Foreign Application Priority Data

Sep. 14, 2023 (JP) ................................. 2023-149468

(51) Int. Cl.
*H04N 25/773* (2023.01)
*G01S 7/4863* (2020.01)
*G01S 7/4865* (2020.01)
*G01S 17/10* (2020.01)
(Continued)

(52) U.S. Cl.
CPC ......... *H04N 25/773* (2023.01); *H04N 25/705* (2023.01); *H04N 25/771* (2023.01)

(58) Field of Classification Search
CPC .. H04N 25/773; H04N 25/705; H04N 25/771; G01S 7/4863; G01S 7/487; G01S 17/10; G01S 17/931; G01S 7/4865
See application file for complete search history.

(56) References Cited

U.S. PATENT DOCUMENTS 11,289,546 B2 * 3/2022 Ryu ........................ H10K 59/35
11,792,529 B2 10/2023 Yamanaka
12,111,423 B2 * 10/2024 Okuni ..................... G01S 17/10
(Continued)

FOREIGN PATENT DOCUMENTS

JP 2020-30211 A 2/2020
JP 2021-1764 A 1/2021
(Continued)

OTHER PUBLICATIONS

U.S. Appl. No. 18/807,012, filed Aug. 16, 2024 by Satoshi Omodani.
(Continued)

*Primary Examiner* — Ahmed A Berhan
(74) *Attorney, Agent, or Firm* — VENABLE LLP

(57) ABSTRACT

A photoelectric conversion device includes: a light receiving unit configured to generate a light reception signal according to incident light by photoelectric conversion; a time-to-digital conversion unit configured to periodically perform an operation of outputting a time count value indicating an elapsed time from light emission of a light source device to input of the light reception signal every time a predetermined period elapses in one ranging period; and a comparison unit configured to output a comparison result based on a first time count value that is a time count value obtained from the time-to-digital conversion unit at a first time included in the one ranging period and a second time count value that is a time count value of a second time included in the one ranging period. The photoelectric conversion device performs processing based on the comparison result.

25 Claims, 14 Drawing Sheets

(51) Int. Cl.
   H04N 25/705          (2023.01)
   H04N 25/771          (2023.01)

(56)                    References Cited

U.S. PATENT DOCUMENTS

| | | | |
|---|---|---|---|
| 12,133,011 B1 | 10/2024 | Kayama | |
| 12,426,282 B2 * | 9/2025 | Wu | .......................... H10D 1/043 |
| 2020/0064451 A1 | 2/2020 | Matsui | |
| 2022/0091262 A1 | 3/2022 | Kubota | |
| 2023/0213381 A1 | 7/2023 | Yamasaki | |
| 2024/0373147 A1 | 11/2024 | Chida | |

FOREIGN PATENT DOCUMENTS

| | | | |
|---|---|---|---|
| JP | 2022-51244 A | 3/2022 | |
| JP | 2023-99398 A | 7/2023 | |

OTHER PUBLICATIONS

U.S. Appl. No. 18/825,667, filed Sep. 5, 2024 by Satoshi Omodani.

* cited by examiner

| ABSOLUTE DIFFERENCE FROM PREVIOUS TIME COUNT VALUE | WEIGHT VALUE |
|---|---|
| GREATER THAN THRESHOLD VALUE | 1 |
| EQUAL TO OR LESS THAN THRESHOLD VALUE | 2 |
| EQUAL TO OR LESS THAN THRESHOLD VALUE FOR TWO CONSECUTIVE TIMES | 4 |
| EQUAL TO OR LESS THAN THRESHOLD VALUE FOR THREE CONSECUTIVE TIMES | 8 |

FIG. 9

| SECOND ABSOLUTE DIFFERENCE FROM SECOND PREVIOUS TIME COUNT VALUE | FIRST ABSOLUTE DIFFERENCE FROM PREVIOUS TIME COUNT VALUE | |
|---|---|---|
| | EQUAL TO OR LESS THAN THRESHOLD VALUE | GREATER THAN THRESHOLD VALUE |
| EQUAL TO OR LESS THAN THRESHOLD VALUE | 8 | 2 |
| GREATER THAN THRESHOLD VALUE | 4 | 1 |

| ABSOLUTE DIFFERENCE FROM TIME COUNT VALUE IN HOLDING UNIT | EQUAL TO OR LESS THAN THRESHOLD VALUE | GREATER THAN THRESHOLD VALUE |
|---|---|---|
| OUTPUT SIGNAL OF COMPARISON UNIT | TIME COUNT VALUE IN HOLDING UNIT | PRESENT TIME COUNT VALUE |
| UPDATE OF TIME COUNT VALUE IN HOLDING UNIT | NOT UPDATED | UPDATED |

PHOTOELECTRIC CONVERSION DEVICE

BACKGROUND OF THE INVENTION

Field of the Invention

The present disclosure relates to a photoelectric conversion device.

Description of the Related Art

Japanese Patent Application Laid-Open No. 2021-001764 discloses a ranging device that measures a distance to an object by repeatedly performing a process of emitting light from a light source and receiving light including reflected light from the object by a light receiving element. In Japanese Patent Application Laid-Open No. 2021-001764, a process of generating a frequency distribution based on a count value indicating a time from light emission to incidence of a photon and a weight determined based on the number of reactions of the light receiving element is performed.

In a photoelectric conversion device as described in Japanese Patent Application Laid-Open No. 2021-001764, it may be required to acquire distance information with higher accuracy.

An object of the present disclosure is to provide a photoelectric conversion device capable of acquiring distance information with high accuracy.

SUMMARY OF THE INVENTION

According to one disclosure of the present specification, there is provided a photoelectric conversion device including: a light receiving unit configured to generate a light reception signal according to incident light by photoelectric conversion; a time-to-digital conversion unit configured to periodically perform an operation of outputting a time count value indicating an elapsed time from light emission of a light source device to input of the light reception signal every time a predetermined period elapses in one ranging period; a comparison unit configured to output a comparison result based on a first time count value that is a time count value obtained from the time-to-digital conversion unit at a first time included in the one ranging period and a second time count value that is a time count value of a second time included in the one ranging period; a weight determination unit configured to output a weight value based on the comparison result; and a frequency distribution generation unit configured to generate a frequency distribution of the time count value in the one ranging period by using the weight value for an addition of a frequency.

According to one disclosure of the present specification, there is provided a photoelectric conversion device including: a light receiving unit configured to generate a light reception signal according to incident light by photoelectric conversion; a time-to-digital conversion unit configured to periodically perform an operation of outputting a time count value indicating an elapsed time from light emission of a light source device to input of the light reception signal every time a predetermined period elapses in one ranging period; and a comparison unit configured to perform comparison based on a first time count value output from the time-to-digital conversion unit at a first time included in the one ranging period and a second time count value output from the time-to-digital conversion unit at a second time before the first time. The comparison unit outputs, based on a result of the comparison, either the first time count value or the second time count value as a time count value to be used for generating a frequency distribution in which a plurality of time intervals and light reception count values are associated with each other, each of the light reception count values being based on the number of times the time count values indicating corresponding time interval are output.

Further features of the present invention will become apparent from the following description of exemplary embodiments with reference to the attached drawings.

BRIEF DESCRIPTION OF THE DRAWINGS

FIG. 2 is a block diagram illustrating a configuration of a light receiving unit and a ranging unit according to the first embodiment.

FIG. 4 is a block diagram illustrating a configuration of the ranging unit according to the first embodiment.

FIG. 6 is a table illustrating a setting example of a weight value according to the first embodiment.

FIG. 9 is a table illustrating a setting example of a weight value according to the second embodiment.

FIG. 10 is a block diagram illustrating a configuration of a ranging unit according to a third embodiment.

FIG. 11 is a table illustrating an operation example of a comparison unit and a holding selection unit according to the third embodiment.

DESCRIPTION OF THE EMBODIMENTS

Figure 1:
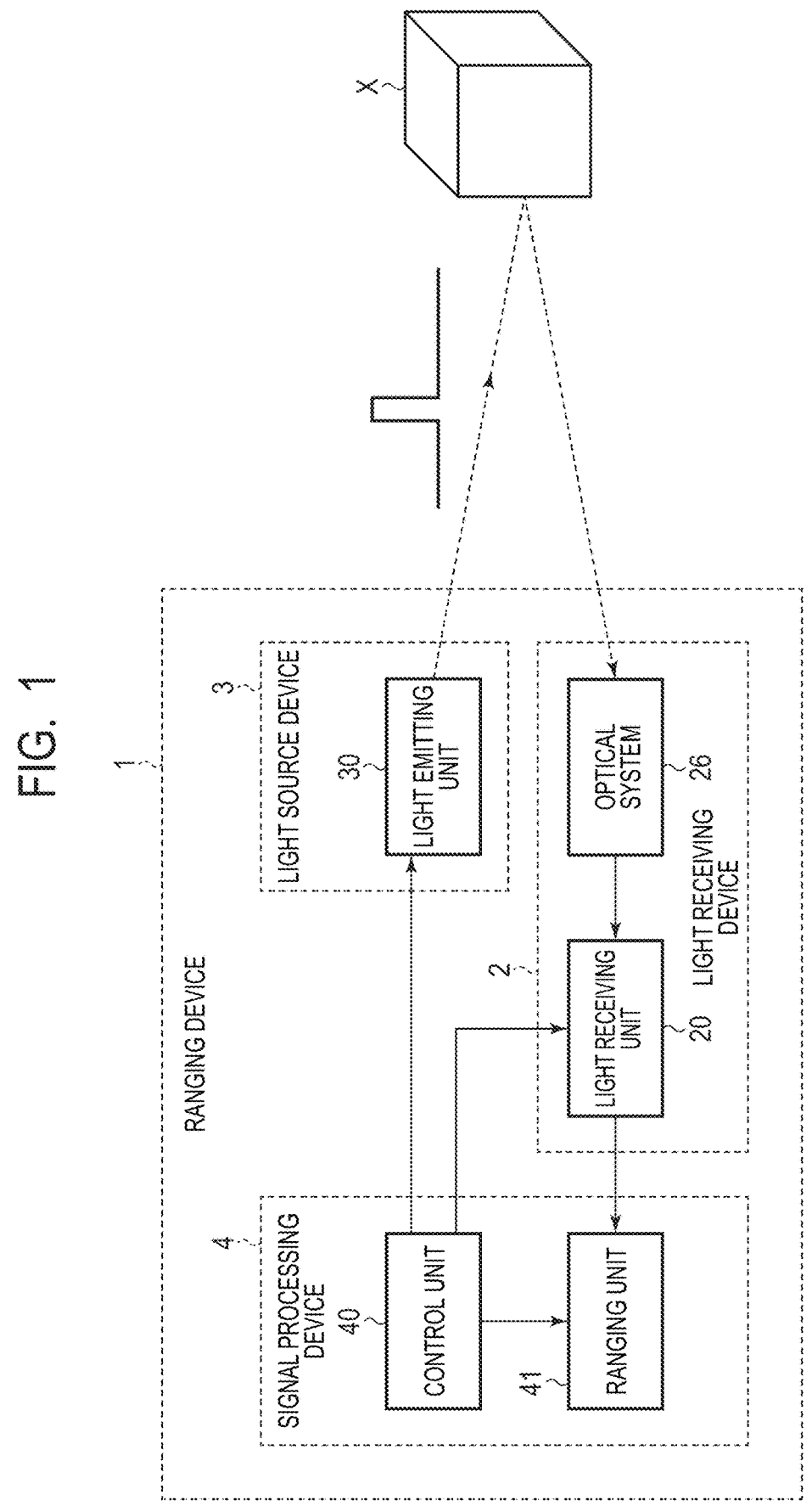
FIG. 1 is a block diagram illustrating a schematic configuration of a ranging device according to a first embodiment.

Hereinafter, embodiments of the present invention will be described with reference to the drawings. The same or corresponding elements are denoted by the same reference numerals throughout the several drawings, and the description thereof may be omitted or simplified.

First Embodiment

FIG. 1 is a block diagram illustrating a schematic configuration of a ranging device 1 according to a first embodiment. As illustrated in FIG. 1, the ranging device 1 includes a light receiving device 2, a light source device 3, and a signal processing device 4. The light receiving device 2 includes a light receiving unit 20 and an optical system 26. The light source device 3 includes a light emitting unit 30. The signal processing device 4 includes a control unit 40 and a ranging unit 41.

Note that the configuration of the ranging device 1 illustrated in the present embodiment is merely an example, and the configuration of the ranging device 1 is not limited to the illustrated configuration. For example, the light source device 3 may be arranged outside the ranging device 1. Also in this case, the light emitting unit 30 operates in accordance with a control signal from the control unit 40. The configuration and operation of the ranging device 1 described in the present embodiment can also be applied to other photoelectric conversion devices that generate signals by photoelectric conversion. Examples of the photoelectric conversion device include an imaging device and a focus detection device.

The ranging device 1 is a device that measures a distance to an object X to be measured using a technique such as light detection and ranging (LiDAR). The ranging device 1 measures the distance from the ranging device 1 to the object X based on a time difference from when the light is emitted from the light source device 3 to when the reflected light from the object X is received by the light receiving device 2. In addition, the ranging device 1 can measure distances at a plurality of points in a two-dimensional manner by emitting light to a predetermined ranging area including the object X and receiving reflected light by the pixel array. Thus, the ranging device 1 can measure and output the distribution of the distance from the ranging device 1 to the object X in the ranging area.

The light received by the light receiving device 2 includes ambient light such as sunlight, disturbance light from other light sources, and the like in addition to the reflected light from the object X. The ranging device 1 repeatedly performs an operation of measuring a time difference between emission of light and reception of reflected light as a time count value a plurality of times. Then, the ranging device 1 generates a frequency distribution in which each of the plurality of time count values is associated with the light reception count value of the pulse based on the incident light. Then, the ranging device 1 performs ranging in which the influence of ambient light or the like is reduced by using a method of determining that the reflected light is incident at a time interval of a time count value corresponding to the maximum value of the light reception count value.

The signal processing device 4 may include a processor that performs arithmetic processing of a digital signal, a memory that stores the digital signal, a control circuit that controls operations of the light receiving device 2 and the light source device 3, and the like. The control unit 40 outputs a control signal for controlling the light emission timing of the light emitting unit 30, a control signal for controlling the operation timing of the light receiving unit 20, and a control signal for controlling the operation timing of the ranging unit 41.

The light source device 3 is a device that emits light such as laser light to the outside of the ranging device 1. The light emitting unit 30 of the light source device 3 includes, for example, a semiconductor laser diode as a light source. The light emitting unit 30 emits laser light having a predetermined pulse width based on a control signal from the control unit 40. The laser light is diffused through an optical system such as a diffusion plate and irradiated to a predetermined area.

The optical system 26 includes an optical element such as a lens that forms an image of incident light on the light receiving unit 20. Reflected light generated by reflection of the laser light emitted from the light emitting unit 30 on the object X forms an image on the light receiving unit 20 via the optical system 26.

The light receiving unit 20 is, for example, a photoelectric conversion device including an avalanche photodiode (hereinafter, referred to as APD) as a photoelectric conversion element. In this case, when one photon is incident on the APD to generate a charge, one pulse is generated by avalanche multiplication. However, the light receiving unit 20 may include, for example, a photoelectric conversion element using another photodiode.

The ranging unit 41 generates a frequency distribution based on an electric signal output from the light receiving unit 20. Further, the ranging unit 41 generates distance information indicating a distance from the ranging device 1 to the object X based on the frequency distribution.

Figure 2:
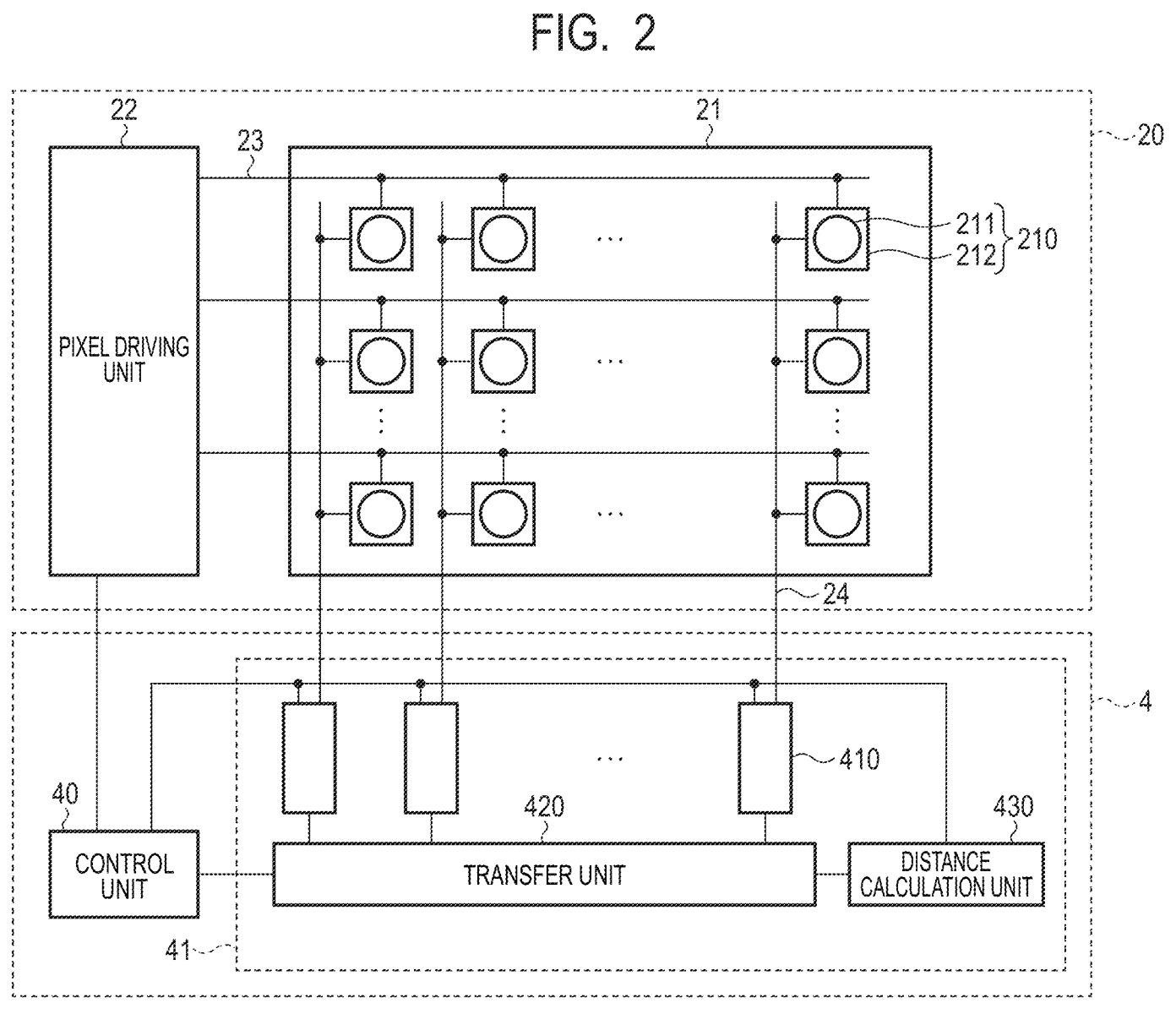

FIG. 2 is a block diagram illustrating a configuration of the light receiving unit 20 and the ranging unit 41 according to the first embodiment. The light receiving unit 20 includes a pixel array 21 and a pixel driving unit 22. The ranging unit 41 includes column processing units 410, a transfer unit 420, and a distance calculation unit 430.

In the pixel array 21, a plurality of pixels 210 is arranged so as to form a plurality of rows and a plurality of columns. Each of the plurality of pixels 210 includes a photoelectric conversion unit 211 including a photoelectric conversion element and a pixel circuit 212. The photoelectric conversion unit 211 generates a signal according to the incident light. The signal generated by the photoelectric conversion unit 211 of each pixel 210 is shaped into a pulse signal in the pixel circuit 212. The pixel circuit 212 outputs the pulse signal to the column processing unit 410 via the signal line 24 arranged for each column of the pixel array 21.

The pixel driving unit 22 supplies a control signal to each of the plurality of pixel circuits 212 based on the control signal supplied from the control unit 40. The pixel driving unit 22 supplies a control signal for each row to each pixel circuit 212 via the driving line 23 provided for each row of the pixel array 21. A logic circuit such as a shift register or an address decoder may be used for the pixel driving unit 22. Accordingly, the pixel driving unit 22 selects a row to which a signal is output from the pixel circuit 212 to the column processing unit 410.

The column processing unit 410 is arranged so as to correspond to each column of the pixel array 21. A timing control signal such as a clock signal is input from the control unit 40 to each of the plurality of column processing units 410. The column processing unit 410 is a signal processing circuit that performs processing such as time-to-digital conversion on the pulse signal output from the pixel circuit 212. The signal output from the column processing unit 410 of each column is input to the transfer unit 420.

The transfer unit 420 is a transfer circuit that sequentially transfers the signal of each column output from the column processing unit 410 to the distance calculation unit 430 based on the control signal supplied from the control unit 40.

The distance calculation unit 430 is a signal processing circuit that processes a signal input from the transfer unit 420. The distance calculation unit 430 may be arranged in a semiconductor chip in which the column processing unit 410 is arranged, or may be arranged in another semiconductor chip (for example, a signal processing circuit chip such as a digital front end).

Although FIG. 2 illustrates a circuit configuration in which the column processing unit 410 processes the output signals of the plurality of pixels 210 in the same column and the distance calculation unit 430 processes the output signals of all the pixels 210 in the pixel array 21, the configuration is not limited thereto. For example, a signal processing circuit corresponding to the column processing unit 410 may be arranged corresponding to each of the plurality of pixels 210, and a signal processing circuit corresponding to the distance calculation unit 430 may be arranged corresponding to each of the plurality of pixels 210. In addition, a signal processing circuit corresponding to the distance calculation unit 430 may be arranged corresponding to each column of the pixel array 21 similarly to the column processing unit 410.

In FIG. 2, a plurality of pixels 210 is two-dimensionally arranged in the pixel array 21, but it is not limited thereto. For example, the arrangement of the plurality of pixels 210 may be one-dimensional. In addition, only a single pixel 210 may be arranged in the light receiving unit 20.

In addition, the function of the pixel circuit 212 may not necessarily be provided in each of the pixels 210 one by one. For example, one pixel circuit 212 may be shared by a plurality of pixels 210. In this case, the pixel circuit 212 provides a signal processing function to the plurality of pixels 210 by sequentially processing the signals output from the plurality of photoelectric conversion units 211.

Figure 3A:
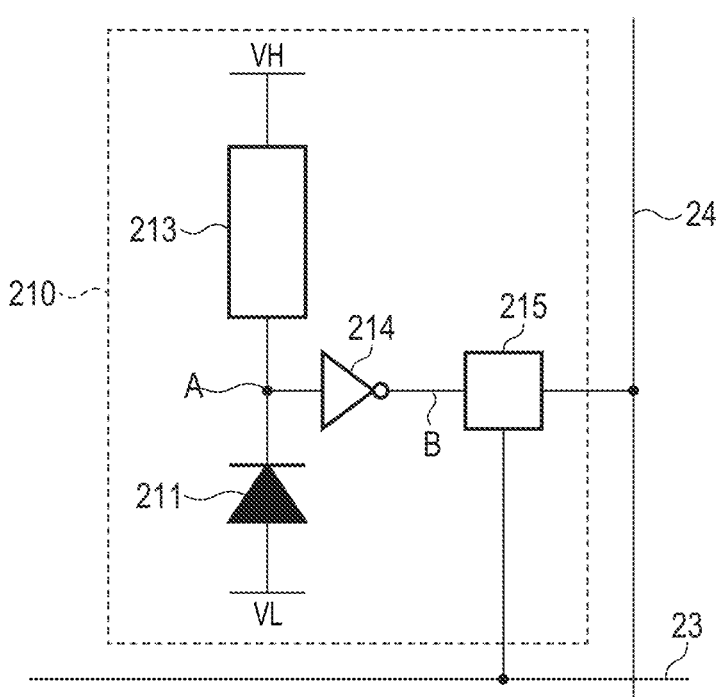
FIG. 3A, FIG. 3B, and FIG. 3C are diagrams illustrating the configuration and operation of the pixel according to the first embodiment.
Figures 3B, 3C:
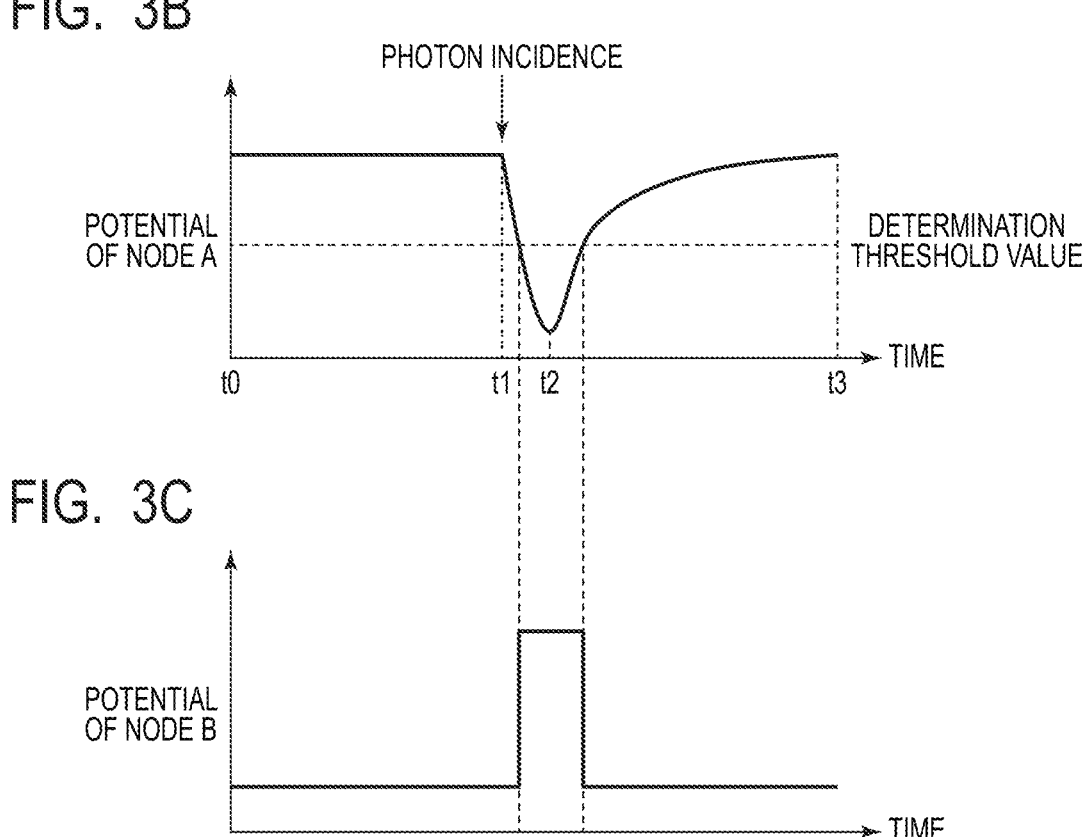

FIG. 3A is a diagram illustrating a configuration of the pixel 210 according to the first embodiment. FIGS. 3B and 3C are diagrams illustrating an operation of the pixel 210. The pixel 210 includes the photoelectric conversion unit 211, a quenching element 213, a waveform shaping unit 214, and a selection circuit 215. The quenching element 213, the waveform shaping unit 214, and the selection circuit 215 correspond to the pixel circuit 212 illustrated in FIG. 2.

The photoelectric conversion unit 211 is an APD, and generates a charge according to incident light by photoelectric conversion. A potential VL is supplied to an anode of the photoelectric conversion unit 211. A cathode of the photoelectric conversion unit 211 is connected to a first terminal of the quenching element 213 and an input terminal of the waveform shaping unit 214. A potential VH higher than the potential VL supplied to the anode is supplied to a second terminal of the quenching element 213. Thus, the anode and the cathode of the photoelectric conversion unit 211 are supplied with a reverse bias voltage that causes the photoelectric conversion unit 211 to perform an avalanche multiplication operation. In the photoelectric conversion unit 211 to which the reverse bias voltage is supplied, when a charge is generated by incident light, the charge causes avalanche multiplication, and an avalanche current is generated.

Note that operation modes when the reverse bias voltage is supplied to the photoelectric conversion unit 211 includes a Geiger mode and a linear mode. The Geiger mode is a mode of operating with a potential difference between the anode and the cathode being larger than the breakdown voltage, and the linear mode is a mode of operating with the potential difference between the anode and the cathode being close to or smaller than the breakdown voltage.

An APD operated in the Geiger mode is referred to as a single photon avalanche diode (SPAD). In this case, for example, the potential VL is-30 V and the potential VHis 1 V. The photoelectric conversion unit 211 may operate in the linear mode or the Geiger mode. In the case of the SPAD, since the potential difference is large and the effect of avalanche multiplication is remarkable as compared with the APD of the linear mode, the SPAD is preferable.

The quenching element 213 functions as a load circuit (quenching circuit) at the time of signal multiplication by avalanche multiplication. The quenching element 213 suppresses the potential supplied to the photoelectric conversion unit 211 to suppress avalanche multiplication (quenching operation). In addition, the quenching element 213 returns the potential supplied to the photoelectric conversion unit 211 to the potential VH by flowing a current corresponding to the potential drop due to the quenching operation (recharge operation). The quenching element 213 may be a resistive element or a MOS transistor. When the quenching element 213 is the MOS transistor, a constant potential may be input to a gate of the MOS transistor. In addition, in the case where the quenching element 213 is the MOS transistor, a periodic pulse signal may be input to the gate of the MOS transistor to perform a recharge operation at a constant cycle.

The waveform shaping unit 214 shapes the potential change of the cathode of the photoelectric conversion unit 211 obtained at the time of photon detection and outputs a pulse signal. As the waveform shaping unit 214, for example, an inverter circuit is used. FIG. 3A illustrates an example in which one inverter is used as the waveform shaping unit 214, but the waveform shaping unit 214 may be a circuit in which a plurality of inverters is connected in series, or may be another circuit having a waveform shaping effect.

A control signal is supplied to the selection circuit 215 from the pixel driving unit 22 illustrated in FIG. 2 via the driving line 23. In response to the control signal, the selection circuit 215 switches between electrical connection and disconnection between an output terminal of the waveform shaping unit 214 and the signal line 24. The selection circuit 215 may include, for example, a switch, a buffer circuit, and the like.

Next, the operation of the pixel 210 will be described with further reference to FIGS. 3B and 3C. As illustrated in FIG. 3A, a connection node of the photoelectric conversion unit 211, the quenching element 213, and the input terminal of the waveform shaping unit 214 is referred to as a node A. As illustrated in FIG. 3A, a connection node between the output terminal of the waveform shaping unit 214 and the selection circuit 215 is referred to as a node B.

FIG. 3B is a graph illustrating a temporal change in the potential of the node A in FIG. 3A. FIG. 3C is a graph illustrating a temporal change in the potential of the node B in FIG. 3A. In a period from time to t0 time t1, a voltage of VH-VL is applied to the photoelectric conversion unit 211 in FIG. 3A. When a photon enters the photoelectric conversion unit 211 at the time t1, avalanche multiplication occurs in the photoelectric conversion unit 211. As a result, an avalanche current flows through the quenching element 213, and the potential of the node A falls. Thereafter, the amount of potential drop further increases, and the voltage applied to the photoelectric conversion unit 211 gradually decreases. Then, at time t2, the avalanche multiplication in the photoelectric conversion unit 211 is stopped. Thus, the potential of the node A does not drop below a certain constant value. After that, in a period from the time t2 to time t3, a current that compensates for the potential drop from the node of the potential VH flows in the node A, and the node A is settled to the original potential at the time t3.

In the above process, the potential of the node B becomes the high level in a period in which the potential of the node A is lower than a certain threshold value. In this manner, the waveform of the potential drop of the node A caused by the incidence of the photon is shaped by the waveform shaping unit 214 and output as a pulse to the node B. The pulse signal is input to the column processing unit 410 through the selection circuit 215 and the signal line 24.

Figure 4:
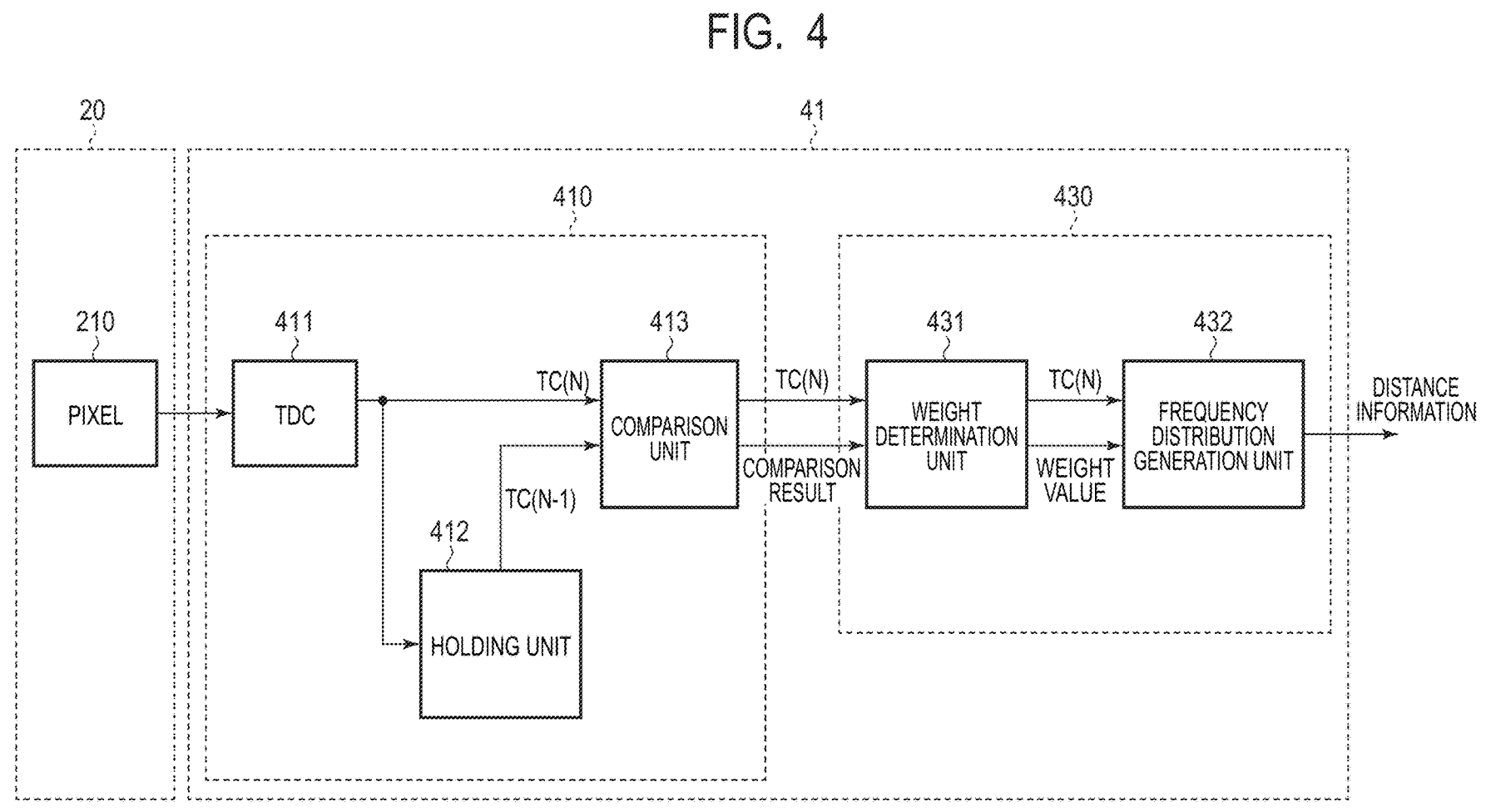

Next, the configuration and operation of the ranging unit 41 will be described in more detail. FIG. 4 is a block diagram illustrating a configuration of the ranging unit 41 according to the present embodiment. FIG. 4 illustrates functional blocks of one pixel 210 among the plurality of pixels 210, one column processing unit 410 corresponding to the one pixel 210, and a distance calculation unit 430. The column processing unit 410 includes a time-to-digital conversion unit (TDC) 411, a holding unit 412, and a comparison unit 413. The distance calculation unit 430 includes a weight determination unit 431 and a frequency distribution generation unit 432.

The pixel 210 of the light receiving unit 20 outputs a pulse signal, which is a light reception signal according to the incident light, to the column processing unit 410. The pulse signal output from the pixel 210 is input to the time-to-digital conversion unit 411. The time-to-digital conversion unit 411 performs time counting by counting pulses of a clock signal input from the control unit 40, and generates a time count value whose value increases by one every time a predetermined time elapses. The time-to-digital conversion unit 411 starts the time counting in synchronization with the light emission timing of the light emitting unit 30, and outputs the time count value at the timing when the pulse signal indicating the incident light is input from the pixel 210 to the holding unit 412 and the comparison unit 413. Accordingly, the time-to-digital conversion unit 411 performs the output operation of the time count value indicating the elapsed time from the light emission of the light emitting unit 30 to the input of the pulse signal indicating the incident light.

The light emission in the light emitting unit 30 and the light reception in the pixel 210 are periodically performed every time a predetermined period elapses within one ranging period. Therefore, the output operation of the time count value in the time-to-digital conversion unit 411 is also periodically performed every time a predetermined period within one ranging period elapses. Hereinafter, a time count value generated corresponding to the N-th (N is an integer) light emission in one ranging period may be referred to as "TC(N)".

The holding unit 412 (first holding unit) temporarily holds the time count value output from the time-to-digital conversion unit 411. The holding unit 412 outputs the held time count value to the comparison unit 413. Therefore, the holding unit 412 has a function of temporarily holding the time count value output from the time-to-digital conversion unit 411 in the past and outputting the past time count value to the comparison unit 413.

The comparison unit 413 compares the time count value input from the time-to-digital conversion unit 411 with the time count value input from the holding unit 412. Here, it is assumed that the comparison timing in the comparison unit 413 is after the N-th light emission in one ranging period. In this case, the N-th time count value TC(N) is output from the time-to-digital conversion unit 411, and the (N−1)-th time count value TC(N−1), which is one cycle earlier, is output from the holding unit 412. That is, the comparison unit 413 compares the time count value TC(N) (first time count value) with the time count value TC(N−1) (second time count value). Then, the comparison unit 413 outputs the time count value TC(N) and the comparison result to the weight determination unit 431.

The update of the time count value in the holding unit 412 is performed after the comparison in the comparison unit 413 is completed. That is, after the comparison between the time count value TC(N) and the time count value TC(N−1) is completed as described above, the holding unit 412 deletes the time count value TC(N−1) and holds the time count value TC(N).

The weight determination unit 431 determines a weight value used for weighting the light reception count value in the generation of the frequency distribution based on the comparison result input from the comparison unit 413. The weight determination unit 431 outputs the time count value and the determined weight value to the frequency distribution generation unit 432.

The frequency distribution generation unit 432 generates a frequency distribution based on the time count value and the weight value. The frequency distribution is data in which the time count values and light reception count values obtained by counting the number of times input for each time count value are associated with each other. Every time the time count value and the weight value are input, the frequency distribution generation unit 432 updates the frequency distribution by adding a value corresponding to the weight value to the light reception count value of the time count value.

When the light emission in the light emitting unit 30 and the light reception in the light receiving unit 20 are performed a predetermined number of times within one ranging period, the generation of the frequency distribution in the frequency distribution generation unit 432 is completed. The frequency distribution generation unit 432 generates distance information from the generated frequency distribution using a predetermined algorithm. This algorithm may detect the maximum value of the light reception count value from the frequency distribution and calculate the distance information from the time count value corresponding to the maximum value, for example. The frequency distribution generation unit 432 may output the frequency distribution as it is without calculating the distance information. In this case, processing of calculating distance information from the frequency distribution may be performed in an external signal processing device. The weight determination unit 431 may be configured to output the time count value and the weight value to the outside, and in this case, the external signal processing device has a function of performing the processing of the frequency distribution generation unit 432.

Figure 5:
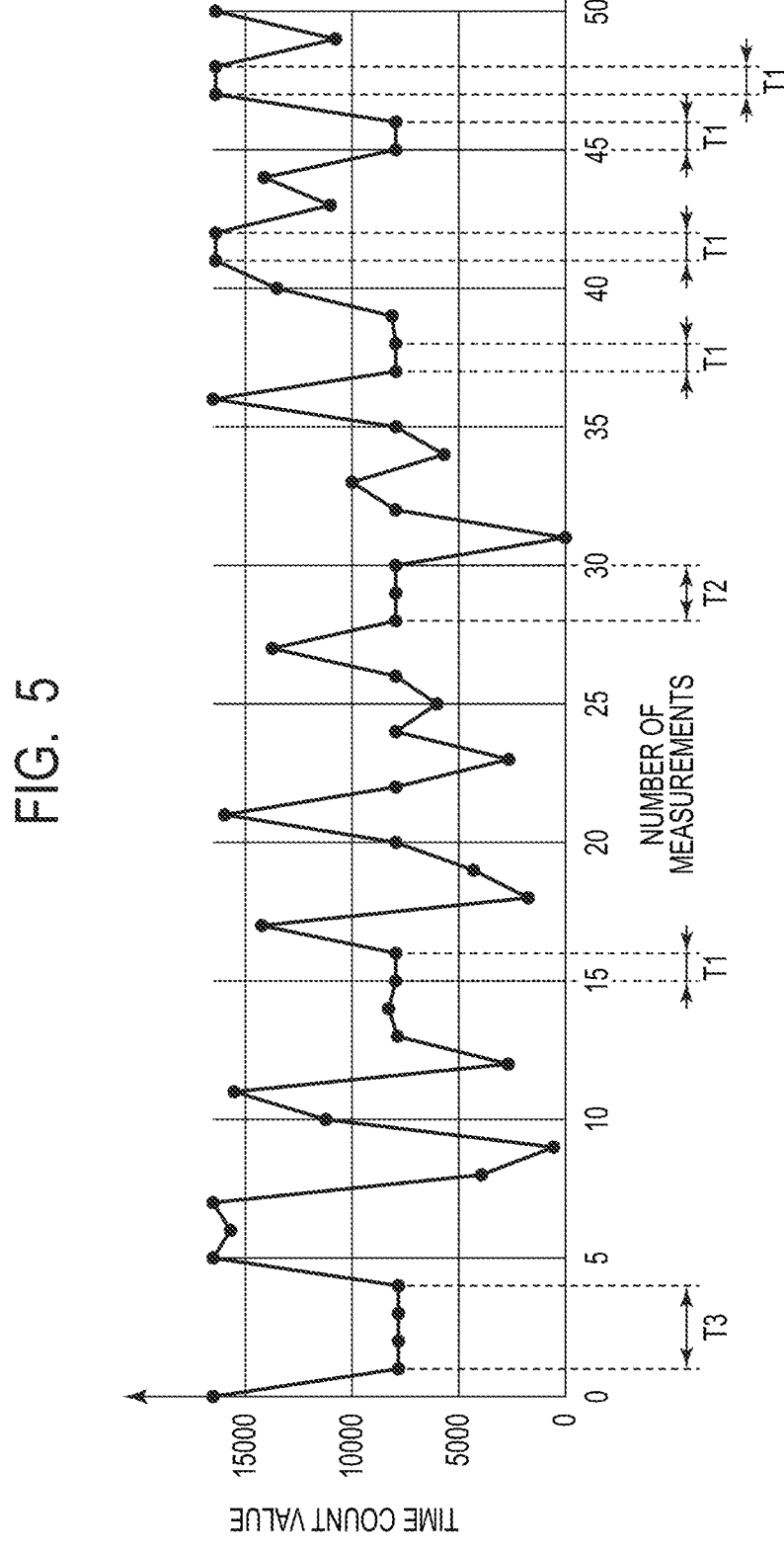
FIG. 5 is a graph illustrating a measurement example of a time count value according to the first embodiment.

Next, with reference to FIGS. 5 to 7, a specific example of processing performed by the ranging unit 41 according to the present embodiment will be described. FIG. 5 is a graph illustrating a measurement example of a time count value according to the present embodiment. The horizontal axis of FIG. 5 indicates the number of times measurement including light emission in the light emitting unit 30 and light reception in the light receiving unit 20 is performed in one ranging period. In the horizontal axis of FIG. 5, the initial measurement is represented as the zeroth measurement. The vertical axis of FIG. 5 indicates a time count value obtained in each measurement.

As described above, the time count value indicates the elapsed time from light emission to light reception in each measurement. Since the elapsed time is proportional to the distance from the ranging device 1 to the object X, if the position of the object X is constant, the time count value in each measurement is expected to be constant. However, as illustrated in FIG. 5, in practice, various values of time count values may be measured. This is because time count values of various values can be measured due to noise such as dark count due to charges generated thermally instead of charges due to incident light, and detection of external light such as sunlight.

Data points at which the time count value is the maximum value (16383) such as the fifth and seventh measurements indicate that a photon has not entered until the time count value in the time-to-digital conversion unit 411 reaches the maximum value. This indicates that the object X reflecting the emitted light does not exist within the predetermined distance range. As described above, the ranging device 1 of the present embodiment can also acquire information indicating the absence of the object X. When the amount of emitted light is small or the reflectance of the object X is small, the probability that the pixel 210 detects a photon is low. Therefore, there is a possibility that a photon cannot be detected in the pixel 210 even if the object X is actually present, and even in such a case, the time count value may be the maximum value. Such a lack of photon detection occurs randomly with a probability according to the amount of incident light, and thus may become a noise factor of the time count value.

As described above, since the time count values caused by the noise become random values, when time count values close to each other are continuously measured, the probability that these time count values are due to noise is low. Therefore, when time count values close to each other are continuously measured, the time count values are likely to appropriately indicate the distance to the object X or the absence of the object X. Therefore, the weight determination unit 431 according to the present embodiment reduces the influence of the time count value caused by noise by increasing the weight of the time count value when the time count values close to each other are continuously acquired.

FIG. 6 is a table illustrating a setting example of a weight value according to the present embodiment. In the example of FIG. 6, the comparison unit 413 calculates an absolute difference (an absolute value of a difference between two values) between the time count value TC(N) at the time of comparison and the previous time count value TC(N−1) at the time of comparison, and determines whether the calculated absolute difference is equal to or less than a threshold value. The comparison unit 413 outputs the comparison result to the weight determination unit 431, and the weight determination unit 431 determines the weight value based on the comparison result.

As illustrated in FIG. 6, when the absolute difference is greater than the threshold value, the weight determination unit 431 determines the weight value to "1" (first weight value), and outputs the weight value to the frequency distribution generation unit 432. When the absolute difference is equal to or less than the threshold value, the weight determination unit 431 determines the weight value to "2" (second weight value), and outputs the weight value to the frequency distribution generation unit 432. Each of five periods T1 in FIG. 5 indicate an output period of the time count value corresponding to a case where an event that the absolute difference is equal to or less than the threshold value occurs only once.

In addition, the weight determination unit 431 has a function of storing the number of times that an event that the absolute difference is equal to or less than the threshold value occurs continuously, up to at least three times. As illustrated in FIG. 6, when an event that the absolute difference is equal to or less than the threshold value occurs two consecutive times, the weight determination unit 431 determines the weight value to "4" (third weight value) and outputs the weight value to the frequency distribution generation unit 432. When an event that the absolute difference is equal to or less than the threshold value occurs three consecutive times, the weight determination unit 431 determines the weight value to "8" and outputs the weight value to the frequency distribution generation unit 432. A period T2 in FIG. 5 indicates an output period of the time count value corresponding to a case where the event that the absolute difference is equal to or less than the threshold value occurs two consecutive times. A period T3 in FIG. 5 indicates an output period of the time count value corresponding to a case where the event that the absolute difference is equal to or less than the threshold value occurs three consecutive times.

In the above-described example, the weight values can be expressed as 2M (M is an integer), such as "1" ($2°$), "2" (21), "4" (22), and "8" (23). By setting the weight value to a value of an integer power of two in this way, it is possible to perform arithmetic processing by bit shift arithmetic, and it is possible to simplify arithmetic processing. However, the setting of the weight value is not limited thereto, and may be a value such as "3" which cannot be expressed as 2M. Further, in some conditions, the weight value may be set to a fraction such as "½", and in this case, the contribution of the time count value satisfying the condition to the frequency distribution can be reduced. That is, M may be a negative integer. In some conditions, the weight value may be set to "0", and in this case, the time count value satisfying the condition may not be reflected in the frequency distribution.

Figure 7:
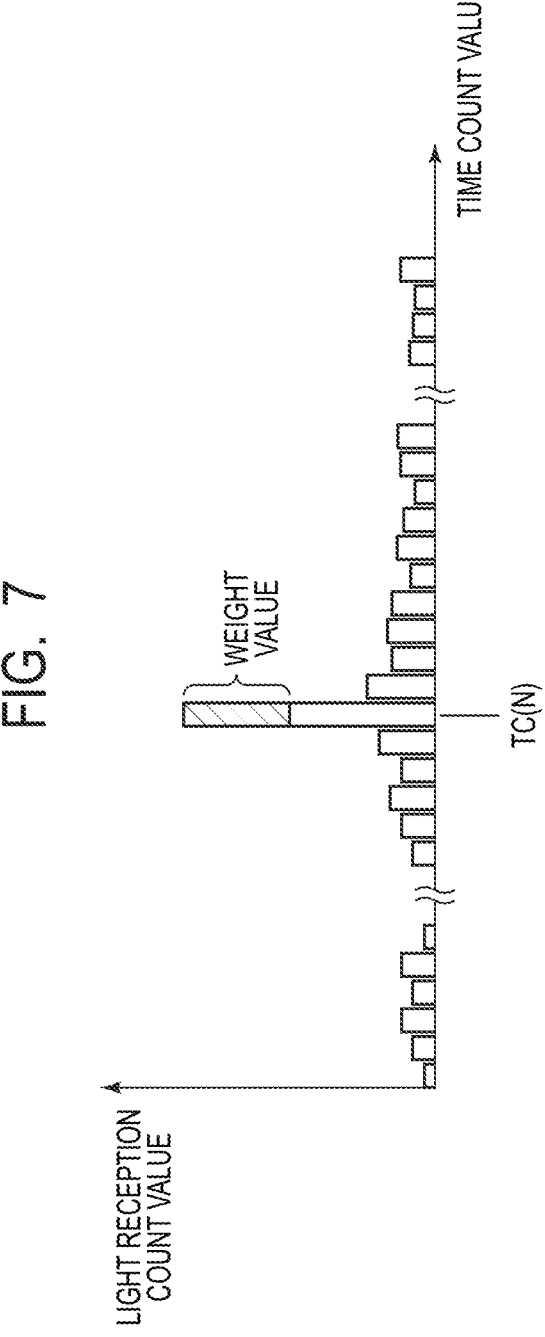
FIG. 7 is a graph illustrating weighting in generation of a frequency distribution according to the first embodiment.

FIG. 7 is a graph illustrating weighting in generation of a frequency distribution according to the present embodiment. The horizontal axis in FIG. 7 is a time count value, and the vertical axis in FIG. 7 is a light reception count value. FIG. 7 illustrates a light reception count value corresponding to each time interval in the form of a columnar graph. FIG. 7 schematically illustrates update processing of the frequency distribution performed when a weight value corresponding to the time count value TC(N) is output from the weight determination unit 431 to the frequency distribution generation unit 432. In this case, the frequency distribution generation unit 432 adds the weight value to the light reception count value of the time count value TC(N). For example, when the weight value is "8", the frequency distribution generation unit 432 updates the frequency distribution by adding eight to the light reception count value corresponding to the time count value TC(N). In FIG. 7, white boxes indicate light reception count values already added before the N-th measurement, and a hatched box indicates light reception count value added in the N-th measurement.

As described above, the weight value determined by the weight determination unit 431 is set so as to increase the weight of the time count value when the time count values having close continuous values are acquired. The time count value generated by noise has a property that values close to each other are difficult to continue. Therefore, the ratio (S/N ratio) of the light reception count value due to the reflected light from the object X to the light reception count value due to the noise can be increased by generating the frequency distribution by performing weighting using the weight value, and the influence of the noise can be reduced.

As described above, according to the present embodiment, the time count value obtained at the time of a certain measurement in one ranging period is compared with the time count value obtained before that, and the weight value is determined based on the comparison result. By applying this weight value to the generation of the frequency distribution, the influence of the time count value caused by a factor different from the reflected light from the object X is reduced. Therefore, according to the present embodiment, a photoelectric conversion device capable of acquiring distance information with high accuracy is provided. In addition, by performing weighted addition of the light reception count values in the frequency distribution by the method of the present embodiment, it is possible to perform ranging with high accuracy.

In the example of FIG. 6, the weight value is defined in the case where the number of consecutive times of the event in which the absolute difference is equal to or less than the threshold value is two and three, but the weight value may be similarly defined in a case where the number of consecutive times is four or more. In this case, for example, when the number of consecutive times is M, the weight value may be 2M.

In the present embodiment, the comparison unit 413 compares the time count value TC(N) at the time of comparison with the time count value TC(N−1) immediately before the time of comparison, but the comparison is not limited thereto. For example, the comparison unit 413 may be configured to compare the time count value TC(N) at the time of comparison with the time count value TC(N−2) two times before at the time of comparison.

Second Embodiment

In the present embodiment, a modification in which a plurality of past time count values can be held in the ranging unit 41 according to the first embodiment will be described. In the present embodiment, description of elements common to those of the first embodiment may be omitted or simplified.

Figure 8:
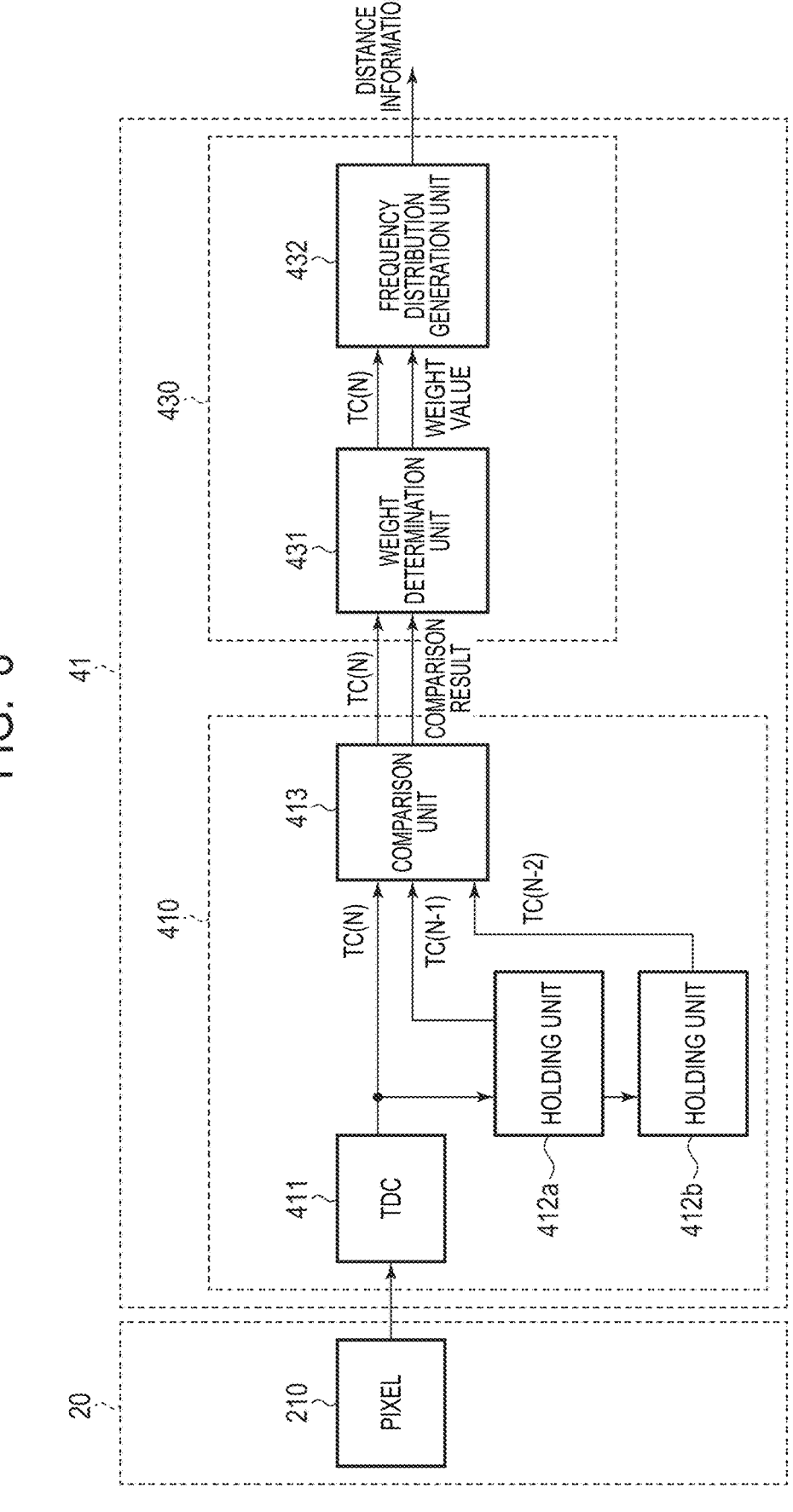
FIG. 8 is a block diagram illustrating a configuration of a ranging unit according to a second embodiment.

FIG. 8 is a block diagram illustrating a configuration of the ranging unit 41 according to the present embodiment. As illustrated in FIG. 8, the column processing unit 410 includes a holding unit 412a (first holding unit) and a holding unit 412b (second holding unit). That is, in the present embodiment, one holding unit 412 in FIG. 4 is replaced with two holding units 412a and 412b.

The holding unit 412a temporarily holds the time count value output from the time-to-digital conversion unit 411. The holding unit 412a outputs the held time count value to the comparison unit 413 and the holding unit 412b. Therefore, the holding unit 412b has a function of holding and outputting the time count value that has output from the time-to-digital conversion unit 411 two cycles before.

The holding unit 412b temporarily holds the time count value output from the holding unit 412a. The holding unit 412a can output the held time count value to the comparison unit 413. Therefore, the holding unit 412a has a function of holding and outputting the time count value that has output from the time-to-digital conversion unit 411 one cycle before.

The comparison unit 413 compares the time count value input from the time-to-digital conversion unit 411 with the time count value input from the holding unit 412a. The comparison unit 413 further compares the time count value input from the time-to-digital conversion unit 411 with the time count value input from the holding unit 412b. Here, it is assumed that the comparison timing in the comparison unit 413 is after the N-th light emission in one ranging period. In this case, the N-th time count value TC(N) is output from the time-to-digital conversion unit 411, and the (N−1)-th time count value TC(N−1), which is one cycle before, is output from the holding unit 412a. Further, the (N−2)-th time count value TC(N−2), which is further one cycle before, is output from the holding unit 412b. That is, the comparison unit 413 compares the time count value TC(N) (first time count value) with the previous time count value TC(N−1) (second time count value) at the time of comparison. Further, the comparison unit 413 compares the time count value TC(N) at the time of comparison with the time count value TC(N−2) (third time count value) of the second previous time at the time of comparison. Then, the comparison unit 413 outputs the time count value TC(N) and the comparison result to the weight determination unit 431.

The update of the time count values in the holding units 412a and 412b is performed after the comparison in the comparison unit 413 is completed. That is, after the comparison based on the time count values TC(N), TC(N−1), and TC(N−2) is completed as described above, the holding unit 412a deletes the time count value TC(N−1) and holds the time count value TC(N). The holding unit 412b deletes the time count value TC(N−2) and holds the time count value TC(N−1).

FIG. 9 is a table illustrating a setting example of a weight value according to the present embodiment. In the example of FIG. 9, the comparison unit 413 calculates a first absolute difference between the time count value TC(N) at the time of comparison and the previous time count value TC(N−1) at the time of comparison, and calculates a second absolute difference between the time count value TC(N) at the time of comparison and the second previous time count value TC(N−2) at the time of comparison. Then, the comparison unit 413 determines whether the calculated first absolute difference is equal to or less than a threshold value and whether the calculated second absolute difference is equal to or less than a threshold value. The comparison unit 413 outputs the comparison results to the weight determination unit 431, and the weight determination unit 431 determines the weight value based on the comparison results. The threshold value used to determine the first absolute difference and the threshold value used to determine the second absolute difference may be the same value or different values.

As illustrated in FIG. 9, when the first absolute difference is greater than the threshold value and the second absolute difference is greater than the threshold value, the weight determination unit 431 determines the weight value to "1" (first weight value), and outputs the weight value to the frequency distribution generation unit 432. When the first absolute difference is greater than the threshold value and the second absolute difference is equal to or less than the threshold value, the weight determination unit 431 determines the weight value to "2" (second weight value) and outputs the weight value to the frequency distribution generation unit 432. When the first absolute difference is equal to or less than the threshold value and the second absolute difference is greater than the threshold value, the weight determination unit 431 determines the weight value to "4" (third weight value) and outputs the weight value to the frequency distribution generation unit 432. When the first absolute difference is equal to or less than the threshold value and the second absolute difference is equal to or less than the threshold value, the weight determination unit 431 determines the weight value to "8" (fourth weight value), and outputs the weight value to the frequency distribution generation unit 432.

In the present embodiment, since the column processing unit 410 includes the two holding units 412a and 412b, the comparison unit 413 can compare the time count value obtained at the time of a certain measurement in one ranging period with the time count value obtained at the second previous time. Therefore, even when the values of the time count values are not necessarily continuous, the ranging device 1 of the present embodiment can determine the weight value with higher accuracy by performing the comparison taking into consideration the measurement up to the second previous measurement. Therefore, a photoelectric conversion device capable of acquiring distance information with high accuracy is provided.

In the configuration of the present embodiment, since the number of holding units is increased as compared with the configuration in which one holding unit is provided as in the first embodiment, the storage capacity is increased. Therefore, the circuit scale of the configuration of the first embodiment can be reduced as compared with the configuration of the present embodiment.

As illustrated in FIG. 9, the weight value "4" when the first absolute difference is equal to or less than the threshold value and the second absolute difference is greater than the threshold value is greater than the weight value "2" when the first absolute difference is greater than the threshold value and the second absolute difference is equal to or less than the threshold value. Thus, weighting can be performed such that the previous time count value TC(N–1) is prioritized over the second previous time count value TC(N–2).

In the present embodiment, an example in which the number of holding units is two is illustrated, but the number of holding units may be three or more. In this case, since the time count value obtained by the past measurement that is before the second previous measurement can be held and used for comparison, the weight value can be determined with higher accuracy.

Third Embodiment

In the present embodiment, a modification in which a past time count value is held in the ranging unit 41 and output as a signal for generating a frequency distribution will be described. In the present embodiment, description of elements common to those of the first embodiment may be omitted or simplified.

Figure 10:
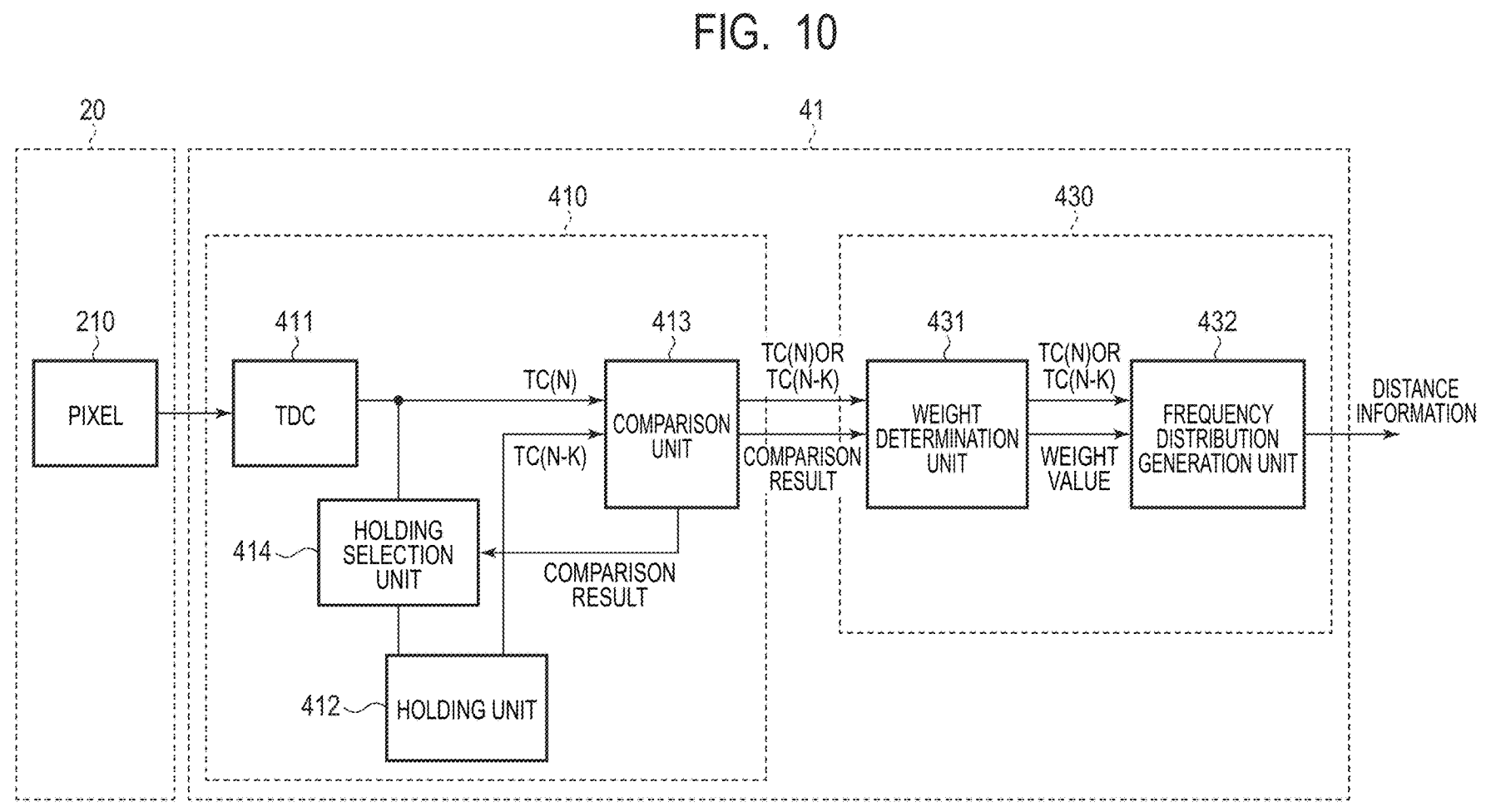

FIG. 10 is a block diagram illustrating a configuration of the ranging unit 41 according to the present embodiment. As illustrated in FIG. 10, the column processing unit 410 according to the present embodiment further includes a holding selection unit 414 in addition to the configuration of the column processing unit 410 illustrated in FIG. 4.

The holding selection unit 414 has a function of selecting whether to output the time count value that is output from the time-to-digital conversion unit 411 to the holding unit 412 to update the time count value. The holding selection unit 414 may be, for example, a switch that switches between connection and disconnection between the time-to-digital conversion unit 411 and the holding unit 412. The selection operation in the holding selection unit 414 is controlled based on the comparison result in the comparison unit 413. Accordingly, the holding unit 412 has a function of outputting the time count value TC(N–K), which is output from the time-to-digital conversion unit 411 K cycles before (K is an integer equal to or greater than one), to the comparison unit 413.

The comparison unit 413 compares the time count value TC(N) input from the time-to-digital conversion unit 411 with the time count value TC(N–K) input from the holding unit 412. Unlike the first embodiment, the comparison unit 413 of the present embodiment has a function of selectively outputting either the time count value TC(N) or the time count value TC(N–K) to the weight determination unit 431 based on the comparison result.

FIG. 11 is a table illustrating an operation example of the comparison unit 413 and the holding selection unit 414 according to the present embodiment. In the example of FIG. 11, the comparison unit 413 calculates an absolute difference between the time count value TC(N) at the time of comparison and the previous time count value TC(N–1) at the time of comparison, and determines whether the calculated absolute difference is equal to or less than a threshold value. The comparison unit 413 outputs the comparison result to the weight determination unit 431 and the holding selection unit 414. The weight determination unit 431 determines a weight value based on the comparison result. The determination of the weight value performed in the weight determination unit 431 can be the same as that in the first embodiment, and thus description thereof will be omitted.

The comparison unit 413 selects which of the time count value TC(N) and the time count value TC(N–K) is to be output to the weight determination unit 431 based on the comparison result. As illustrated in FIG. 11, when the absolute difference is greater than the threshold value, the comparison unit 413 outputs the time count value TC(N) at the time of comparison to the weight determination unit 431. When the absolute difference is equal to or less than the threshold value, the comparison unit 413 outputs the time count value TC(N–K) held in the holding unit 412 to the weight determination unit 431.

The holding selection unit 414 selects whether to update the time count value in the holding unit 412 based on the comparison result. When the absolute difference is greater than the threshold value, the holding selection unit 414 operates to update the time count value TC(N–K) held in the holding unit 412 to the time count value TC(N). When the absolute difference is equal to or less than the threshold value, the holding selection unit 414 operates so that the time count value TC(N–K) held in the holding unit 412 is not updated and is maintained as it is. When the time count value in the holding unit 412 is updated, the updating operation is performed after the comparison in the comparison unit 413 is completed.

In the present embodiment, the comparison unit 413 compares the time count value TC(N) with the time count value TC(N–K), and selectively outputs one of them to the weight determination unit 431 according to the comparison result. When the time count value TC(N–K) is output, the time count value is not updated. As a result, in a case where the time count values close to each other are acquired a plurality of times continuously, the comparison unit 413 can repeatedly output the same time count value. When the same time count value is repeatedly input to the frequency distribution generation unit 432, the count number of the light reception count value at the same time interval is repeatedly added. Accordingly, a frequency distribution in which the light reception count value due to the reflected light from the object X is further emphasized is generated, and the influence of noise is reduced. Therefore, a photoelectric conversion device capable of acquiring distance information with high accuracy is provided.

In the present embodiment, the determination of the weight value by the weight determination unit 431 and the weighting in the frequency distribution generation unit 432 are not essential. That is, the time count value output from the comparison unit 413 may be used for generation of the frequency distribution without being weighted. Also in this case, by repeatedly adding the count numbers of the light reception count values at the same time interval, the influence of noise is reduced, and a photoelectric conversion device capable of acquiring a signal with high accuracy is provided.

Fourth Embodiment

Figure 12:
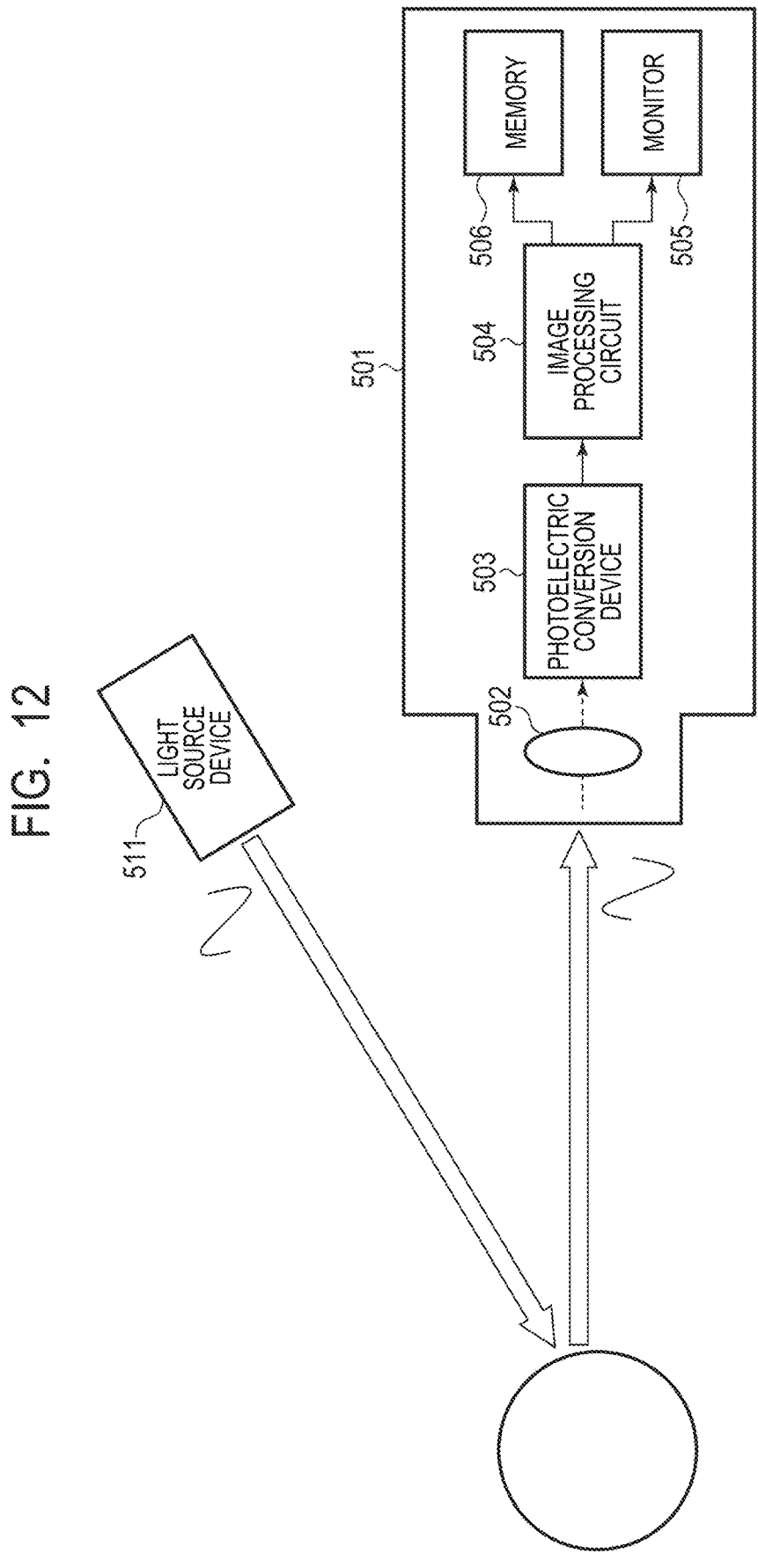
FIG. 12 is a schematic diagram of a photodetection system according to a fourth embodiment.

FIG. 12 is a block diagram of a photodetection system according to the present embodiment. More specifically, FIG. 12 is a block diagram of a distance image sensor using the ranging device 1 described in the above-described embodiments.

As illustrated in FIG. 12, the distance image sensor 501 includes an optical system 502, a photoelectric conversion device 503, an image processing circuit 504, a monitor 505, and a memory 506. The distance image sensor 501 receives light (modulated light or pulse light) emitted from the light source device 511 toward an object and reflected by the surface of the object. The distance image sensor 501 can acquire a distance image corresponding to a distance to the object based on a time period from light emission to light reception. The light source device 511 corresponds to the light source device 3 of the above-described embodiments.

The optical system 502 includes one or a plurality of lenses, and guides image light (incident light) from the object to the photoelectric conversion device 503 to form an image on a light receiving surface (sensor unit) of the photoelectric conversion device 503. The optical system 502 corresponds to the optical system 26 of the above-described embodiments.

As the photoelectric conversion device 503, the light receiving unit 20 and the ranging unit 41 of each of the embodiments described above can be applied. The photoelectric conversion device 503 supplies a distance signal indicating a distance obtained from the received light signal to the image processing circuit 504.

The image processing circuit 504 (signal processing unit) performs image processing for constructing a distance image based on the distance signal supplied from the photoelectric conversion device 503. The distance image (image data) obtained by the image processing can be displayed on the monitor 505 and stored (recorded) in the memory 506.

The distance image sensor 501 configured in this manner can acquire an accurate distance image by applying the configuration of the above-described embodiments.

Fifth Embodiment

Figure 13A:
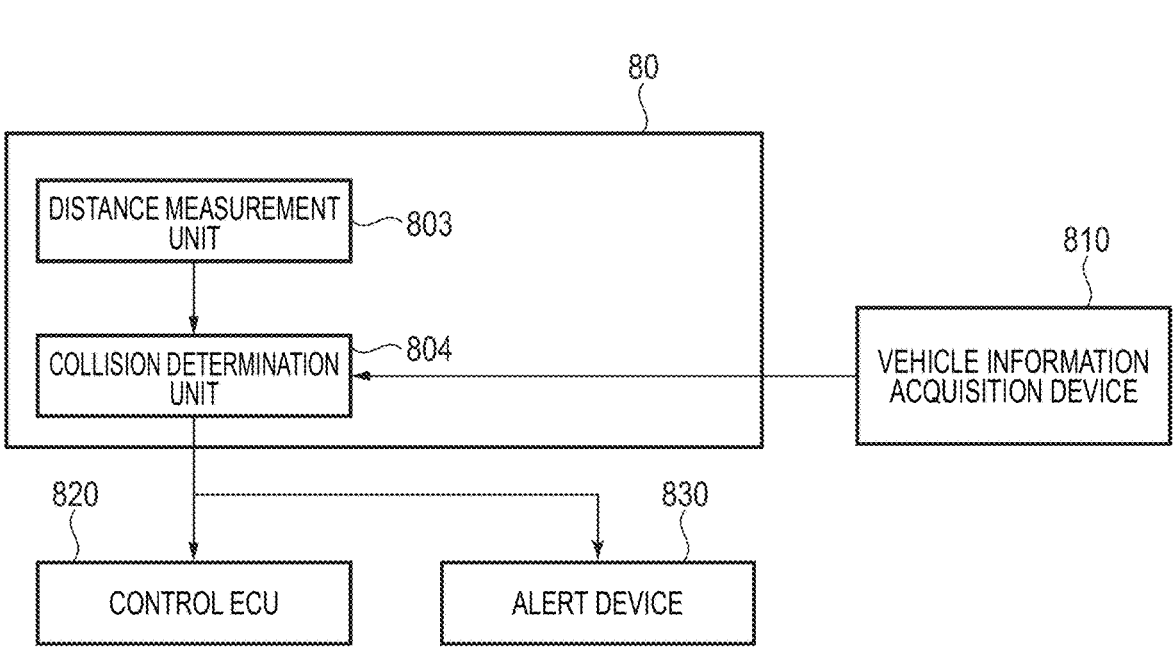
FIG. 13A and FIG. 13B are schematic diagrams of equipment according to a fifth embodiment.
Figure 13B:
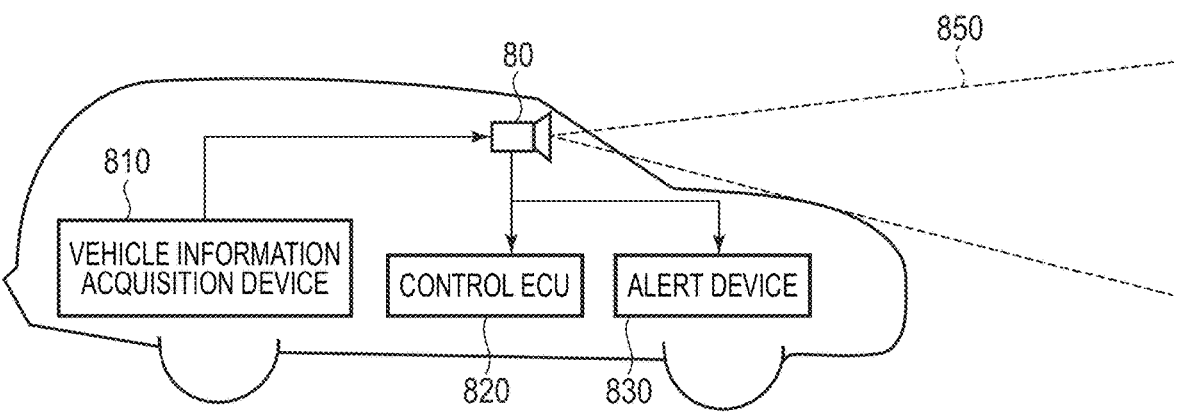

FIGS. 13A and 13B are block diagrams of equipment relating to an in-vehicle ranging device according to the present embodiment. Equipment 80 includes a distance measurement unit 803, which is an example of the ranging device 1 of the above-described embodiments, and a signal processing device (processing device) that processes a signal from the distance measurement unit 803. The equipment 80 includes the distance measurement unit 803 that measures a distance to an object, and a collision determination unit 804 that determines whether or not there is a possibility of collision based on the measured distance. The distance measurement unit 803 is an example of a distance information acquisition unit that obtains distance information to the object. That is, the distance information is information on a distance to the object or the like. The collision determination unit 804 may determine the collision possibility using the distance information.

The equipment 80 is connected to a vehicle information acquisition device 810, and can obtain vehicle information such as a vehicle speed, a yaw rate, and a steering angle. Further, the equipment 80 is connected to a control ECU 820 which is a control device that outputs a control signal for generating a braking force to the vehicle based on the determination result of the collision determination unit 804. The equipment 80 is also connected to an alert device 830 that issues an alert to the driver based on the determination result of the collision determination unit 804. For example, when the collision possibility is high as the determination result of the collision determination unit 804, the control ECU 820 performs vehicle control to avoid collision or reduce damage by braking, returning an accelerator, suppressing engine output, or the like. The alert device 830 alerts the user by sounding an alarm, displaying alert information on a screen of a car navigation system or the like, or giving vibration to a seat belt or a steering wheel. These devices of the equipment 80 function as a movable body control unit that controls the operation of controlling the vehicle as described above.

In the present embodiment, ranging is performed in an area around the vehicle, for example, a front area or a rear area, by the equipment 80. FIG. 13B illustrates equipment when ranging is performed in the front area of the vehicle (ranging area 850). The vehicle information acquisition device 810 as a ranging control unit sends an instruction to the equipment 80 or the distance measurement unit 803 to perform the ranging operation. With such a configuration, the accuracy of distance measurement can be further improved.

Although the example of control for avoiding a collision to another vehicle has been described above, the embodiment is applicable to automatic driving control for following another vehicle, automatic driving control for not going out of a traffic lane, or the like. Furthermore, the equipment is not limited to a vehicle such as an automobile and can be applied to a movable body (movable apparatus) such as a ship, an airplane, a satellite, an industrial robot and a consumer use robot, or the like, for example. In addition, the equipment can be widely applied to equipment which utilizes object recognition or biometric authentication, such as an intelligent transportation system (ITS), a surveillance system, or the like without being limited to movable bodies.

Modified Embodiments

The present invention is not limited to the above embodiments, and various modifications are possible. For example, an example in which some of the configurations of any one of the embodiments are added to other embodiments and an example in which some of the configurations of any one of the embodiments are replaced with some of the configurations of other embodiments are also embodiments of the present invention. The disclosure of this specification includes a complementary set of the concepts described in this specification. That is, for example, if a description of "A is B" (A=B) is provided in this specification, this specification is intended to disclose or suggest that "A is not B" even if a description of "A is not B" (A≠B) is omitted. This is because it is assumed that "A is not B" is considered when "A is B" is described.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

It should be noted that any of the embodiments described above is merely an example of an embodiment for carrying out the present disclosure, and the technical scope of the present disclosure should not be construed as being limited by the embodiments. That is, the present disclosure can be implemented in various forms without departing from the technical idea or the main features thereof.

According to the present disclosure, a photoelectric conversion device capable of acquiring distance information with high accuracy is provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-149468, filed Sep. 14, 2023, which is hereby incorporated by reference herein in its entirety.

What is claimed is:

1. A photoelectric conversion device comprising:
a light receiving unit configured to generate a light reception signal according to incident light by photoelectric conversion;
a time-to-digital conversion unit configured to periodically perform an operation of outputting a time count value indicating an elapsed time from light emission of a light source device to input of the light reception signal every time a predetermined period elapses in one ranging period;
a comparison unit configured to output a comparison result based on a first time count value that is a time count value obtained from the time-to-digital conversion unit at a first time included in the one ranging period and a second time count value that is a time count value of a second time included in the one ranging period;
a weight determination unit configured to output a weight value based on the comparison result; and
a frequency distribution generation unit configured to generate a frequency distribution of the time count value in the one ranging period by using the weight value for an addition of a frequency.

2. The photoelectric conversion device according to claim 1, wherein the weight determination unit outputs the weight value based on an absolute difference between the first time count value and the second time count value.

3. The photoelectric conversion device according to claim 2, wherein the weight determination unit outputs a first weight value when the absolute difference is greater than a threshold value, and outputs a second weight value greater than the first weight value when the absolute difference is equal to or less than the threshold value.

4. The photoelectric conversion device according to claim 1, wherein the weight determination unit stores a past comparison result, and outputs the weight value further based on the past comparison result.

5. The photoelectric conversion device according to claim 4, wherein the weight determination unit outputs a first weight value when an absolute difference between the first time count value and the second time count value is greater than a threshold value, outputs a second weight value greater than the first weight value when the absolute difference is equal to or less than the threshold value, and outputs a third weight value greater than the second weight value when a comparison result in which the absolute difference is equal to or less than the threshold value is repeated a plurality of times.

6. The photoelectric conversion device according to claim 1 further comprising a first holding unit configured to hold a time count value output from the time-to-digital conversion unit,
wherein the comparison unit acquires the time count value held in the first holding unit as the second time count value.

7. The photoelectric conversion device according to claim 6, wherein the first holding unit updates the time count value held in the first holding unit every time the time count value is output from the time-to-digital conversion unit.

8. The photoelectric conversion device according to claim 1, wherein the second time is a period immediately before the first time.

9. The photoelectric conversion device according to claim 1, wherein the comparison unit outputs the comparison result further based on a third time count value output from the time-to-digital conversion unit at a third time included in the same ranging period as the ranging period including the first time and before the second time.

10. The photoelectric conversion device according to claim 9, wherein the weight determination unit outputs the weight value based on a first absolute difference between the first time count value and the second time count value and a second absolute difference between the first time count value and the third time count value.

11. The photoelectric conversion device according to claim 10, wherein the weight determination unit outputs a first weight value when the first absolute difference and the second absolute difference are greater than a threshold value, and outputs a second weight value greater than the first weight value when the first absolute difference is greater than the threshold value and the second absolute difference is equal to or less than the threshold value.

12. The photoelectric conversion device according to claim 11, wherein, the weight determination unit outputs a third weight value greater than the second weight value when the first absolute difference is equal to or less than the threshold value and the second absolute difference is greater than the threshold value.

13. The photoelectric conversion device according to claim 12, wherein the weight determination unit outputs a fourth weight value greater than the third weight value when the first absolute difference and the second absolute difference are equal to or less than the threshold value.

14. The photoelectric conversion device according to claim 9 further comprising:
a first holding unit configured to hold a time count value output from the time-to-digital conversion unit; and
a second holding unit configured to hold a time count value output from the first holding unit.

15. The photoelectric conversion device according to claim 14, wherein every time the time count value is input from the time-to-digital conversion unit, the first holding unit updates the time count value held in the first holding unit to the time count value input from the time-to-digital conversion unit, and the second holding unit updates the time count value held in the second holding unit to the time count value input from the first holding unit.

16. The photoelectric conversion device according to claim 9, wherein the second time is a period immediately before the first time, and wherein the third time is a period immediately before the second time.

17. The photoelectric conversion device according to claim 1 further comprising a first holding unit configured to hold a time count value output from the time-to-digital conversion unit, wherein the comparison unit acquires the time count value held in the first holding unit as the second time count value, and wherein the comparison unit outputs either the first time count value or the second time count value as a signal for generating the frequency distribution based on the comparison result.

18. The photoelectric conversion device according to claim 17 further comprising a selection unit configured to control whether to update the time count value in the first holding unit based on the comparison result.

19. The photoelectric conversion device according to claim 18, wherein the comparison unit outputs either the first time count value or the second time count value as a signal for generating the frequency distribution based on an absolute difference between the first time count value and the second time count value, and wherein the selection unit controls whether to update the time count value in the first holding unit based on the absolute difference.

20. The photoelectric conversion device according to claim 19, wherein the comparison unit outputs the first time count value as a signal for generating the frequency distribution when the absolute difference is greater than a threshold value, and outputs the second time count value as a signal for generating the frequency distribution when the absolute difference is equal to or less than the threshold value, and wherein the selection unit controls the first holding unit to update the time count value in the first holding unit when the absolute difference is greater than the threshold value, and controls the first holding unit so as not to update the time count value in the first holding unit when the absolute difference is equal to or less than the threshold value.

21. A photodetection system comprising:

the photoelectric conversion device according to claim 1; and a signal processing unit configured to process a signal output from the photoelectric conversion device.

22. A movable body comprising:

the photoelectric conversion device according to claim 1; and a movable body control unit configured to control the movable body based on distance information acquired by the photoelectric conversion device.

23. A photoelectric conversion device comprising:

a light receiving unit configured to generate a light reception signal according to incident light by photoelectric conversion;

a time-to-digital conversion unit configured to periodically perform an operation of outputting a time count value indicating an elapsed time from light emission of a light source device to input of the light reception signal every time a predetermined period elapses in one ranging period; and a comparison unit configured to perform comparison based on a first time count value output from the time-to-digital conversion unit at a first time included in the one ranging period and a second time count value output from the time-to-digital conversion unit at a second time before the first time, wherein the comparison unit outputs, based on a result of the comparison, either the first time count value or the second time count value as a time count value to be used for generating a frequency distribution in which a plurality of time intervals and light reception count values are associated with each other, each of the light reception count values being based on the number of times the time count values indicating corresponding time interval are output.

24. A photodetection system comprising:

the photoelectric conversion device according to claim 23; and a signal processing unit configured to process a signal output from the photoelectric conversion device.

25. A movable body comprising:

the photoelectric conversion device according to claim 23; and a movable body control unit configured to control the movable body based on distance information acquired by the photoelectric conversion device.

* * * * *